United States Patent [19]

Nakamura

[11] Patent Number: 4,549,173

[45] Date of Patent: Oct. 22, 1985

[54] APPARATUS FOR CONTROLLING THE SCROLLING RATE OF A VIDEO DISPLAY

[75] Inventor: Toshiteru Nakamura, Tokyo, Japan

[73] Assignee: Sony Corporation, Tokyo, Japan

[21] Appl. No.: 414,517

[22] Filed: Sep. 2, 1982

[30] Foreign Application Priority Data

Sep. 8, 1981 [JP] Japan .............................. 56-141232

[51] Int. Cl.[4] .............................................. G09G 1/16
[52] U.S. Cl. .................... 340/726; 340/750; 340/749; 340/706; 360/14.1
[58] Field of Search ............... 340/726, 710, 724, 723, 340/750, 749, 706; 360/10.3, 14.1, 10.1

[56] References Cited

U.S. PATENT DOCUMENTS

| | | | |
|---|---|---|---|
| 3,242,470 | 5/1966 | Hagelbarger et al. | 340/726 |
| 3,406,387 | 10/1968 | Werme | 340/726 |
| 3,541,521 | 11/1970 | Koster | 340/710 |
| 4,161,001 | 7/1979 | Sakamoto | 360/14.1 |
| 4,428,005 | 1/1984 | Kubo | 360/10.3 |

*Primary Examiner*—Marshall M. Curtis
*Attorney, Agent, or Firm*—Lewis H. Eslinger

[57] ABSTRACT

An apparatus for displaying a data stored in a memory on a display panel, such as a cathode ray tube in a scroll mode in which the data is scrolled on the display panel at a rate dependent on a renewal speed of a read out address of the memory, and is provided with manually rotatable dial means for generating a control signal for controlling the renewal speed of the read out address of the memory and therefore the scroll speed of the data, the control signal being dependent on the rotation of the manually rotatable dial, that is, rotational angle or rotational speed of the dial. Further, in an editing apparatus to which this invention is applied, the manually rotatable dial concurrently controls the tape transport speed of the video tape recorders, the video signals reproduced from the video tape recorders being edited.

8 Claims, 4 Drawing Figures

APPARATUS FOR CONTROLLING THE SCROLLING RATE OF A VIDEO DISPLAY

BACKGROUND OF THE INVENTION

1. Field of the Invention

This invention relates generally to an apparatus for displaying a data stored in a memory on a display panel, such as a cathode ray tube and more particularly is directed to such apparatus with a controller for controlling the scroll speed of the data to be displayed and scrolled on a display panel.

2. Description of the Prior Art

In an editing machine for editing signals reproduced from video tape recorders, an automatic editing operation in which the data, such as the number of the tape in which a desired scene is recorded, starting and ending time codes of the desired scene and the way of how to connect the scenes, that is, cut, wipe or dissolve is stored in a memory in sequence according to the sequence of the editing and the stored data in the memory is utilized for editing is proposed. In such a automatic editing operation, there is an requirement to check the data by which the editing is finished in the course of editing. In an existing machine, the data stored in the memory is retrieved sequentially and supplied to a printer and the data is printed out on the paper. However, according to this method, a large amount of paper for printing out is required and the control of the printed out paper is very troublesome. Therefore, another method in which the retrieved data is converted to a video signal and is supplied to a monitor receiver is proposed. And, in this case, the data is displayed in a scroll mode. According to this scroll mode, each time the data of one column is read out from the memory the display on the screen is shifted up by one column and the newly read out data is displayed at the bottom column, thereby the contents of display are run upward. However in this method, the scroll speed of the display is constant or is changeable in two or three steps, and the speed can not be varied linearly. Therefore when the scroll speed is selected to be slow, a long time is required to find out the desired data and when the scroll speed is selected to be fast, it is difficult to stop scrolling at a desired position. Further, various kinds of operation keys, such as a scroll key, a speed change key, and a scroll stop key are required and so the operation is very complicated.

OBJECTS AND SUMMARY OF THE INVENTION

Accordingly, an object of this invention is to provide an apparatus for displaying a data stored in a memory free from the above mentioned disadvantages of the prior art.

Another object of this invention is to provide a display apparatus with a scroll speed controller of a simple construction having an improved operation.

Further object of this invention is to provide a display apparatus with a scroll speed controller in which the scroll speed of data can be varied linearly as is desired.

Still further object of this invention is to provide a display apparatus in which a desired data can be retrieved quickly and easily.

In accordance with an aspect of this invention, in an apparatus having a memory, a central processing unit for reading out the contents of the memory in a predetermined sequence, a display panel on which the data read out by the central processing unit is displayed and for displaying the data on the display panel in a scroll mode, the scroll speed, that is, the renewal speed of the read out address defined by the central processing unit can be controlled by a rotational angle or rotational speed of a rotational dial or wheel. Further, this dial can be utilized concurrently as a tape speed control dial when the display apparatus according to this invention is used in an editing machine.

The other objects, features and advantages of the present invention will become apparent from the following description taken in conjunction with the accompanying drawings through which the like references designate the same elements and parts.

DETAILED DESCRIPTION OF A PREFERRED EMBODIMENT

Figure 1:
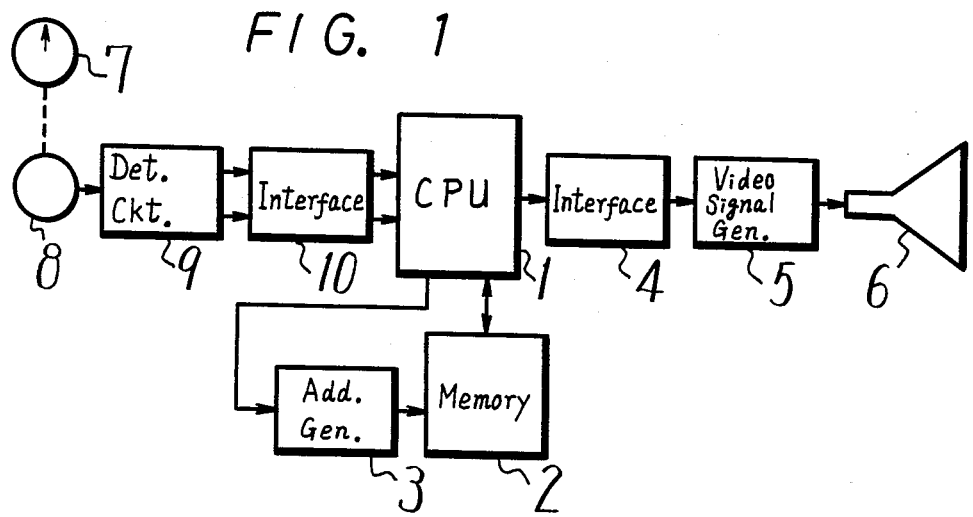
FIG. 1 is a schematic view illustrating a display apparatus in accordance with an embodiment of this invention.

Referring to the drawings in detail, and initially to FIG. 1 thereof, an embodiment of this invention will be described hereinafter.

In FIG. 1, reference numeral 1 shows a central processing unit, hereinafter called a CPU to which a memory 2 is connected. A signal from the CPU 1 is supplied to an address signal generator 3, in which an address signal is formed in response to the signal derived from the CPU 1 and then supplied to an address terminal of the memory 2.

A data signal stored in the memory 2 is supplied to a video signal generator 5 through the CPU 1 and an interface circuit 4. In this video signal generator 5, the data signal is converted to a video signal indicating the data and then supplied to a cathode ray tube 6.

Thus, the data stored in the memory 2 is read out by the address signal from the address signal generator 3. This address signal is renewed at a predetermined rate and therefore the data signal converted to the video signal is displayed on a display panel of the cathode ray tube 6 in a scroll mode.

Reference numeral 7 shows a rotational dial or wheel. A pulse generator 8 for generating a pulse at every predetermined rotational angle of the rotational dial 7 is provided to be coupled to the rotational shaft thereof. The pulse from the pulse generator 8 is supplied to a detecting circuit 9, whereby the waveform of the pulse is reshaped and a signal indicating the rotational direction of the rotational dial 7 is formed. These signals are supplied to the CPU 1 through an interface circuit 10.

In this circuit, the scroll speed of the display is controlled in accordance with the rotation of the rotational dial 7. That is, the pulse from the pulse generator 8 renews the read out address generated in the address signal generator 3.

There are suggested two ways of the renewal of the address signal. In a first way, the renewal speed of the address signal corresponds to a rotational speed of the rotational dial 7. Thereby, the scroll speed of the data displayed can be controlled by the rotational speed of the rotational dial 7. Hence at the portion of the undesired data, the scroll speed can be selected to be fast by rotating the rotational dial 7 rapidly. If the portion of the desired data comes nearby, the rotational speed is slowed down and the desired data can be found out easily. Further, the data can be scrolled downwardly by rotating the rotational dial 7 in a reverse direction.

Figure 2:
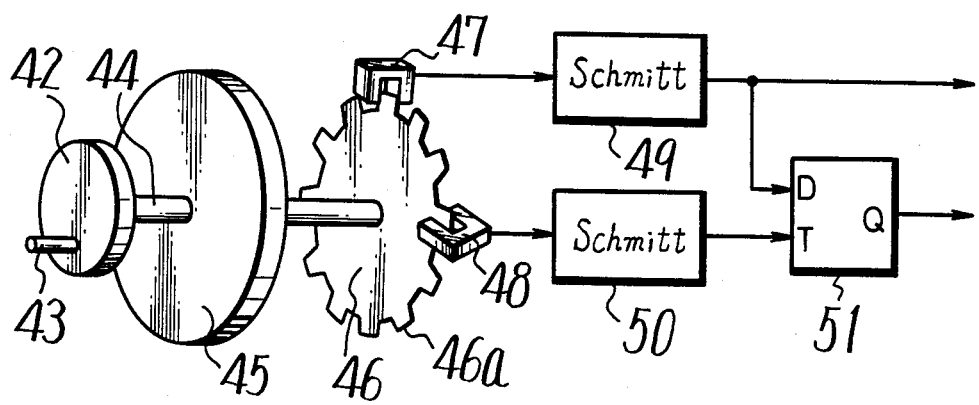
FIG. 2 is a schematic view of one structual embodiment of a device included in the display apparatus of FIG. 1.

This embodiment will be explained in detail with reference to FIG. 2. In FIG. 2, the detailed construction of the rotational dial 7, the pulse generator 8 and the detecting circuit 9 is shown, which includes a manually rotatable dial or wheel 42 conveniently provided with a crank handle 43 and being mounted on a shaft 44 which is journalled in substantially friction-free mounting of the shaft 44 and the substantial moment of inertia, for example, from several hundreds to several thousands gcm$^2$. By reason of the substantially friction-free mounting of the shaft 44 and the substantial moment of inertia of a fly-wheel 45 acting on such shaft 44, the shaft 44 may be brought up to any selected speed of rotation by manual rotation of the wheel 42, and thereafter, upon release of the wheel 42, the shaft 44 will continue to free-wheel to substantially at such speed for an extended period of time or until rotation of the shaft 44 is slowed or halted by manual grasping of wheel 42. A photo-disc 46 is further shown to be secured on the shaft 44 for rotation with the latter, and the periphery of the photo-disc 46 is formed with spaced apart cutouts defining a substantial number, for example, 120 of radially directed light shielding portions 46a between the successive cutouts.

Two angularly spaced apart photo-couplers 47 and 48 are associated with the photo-disk 46 so as to constitute first and second signal generating means providing first and second pulse signals of different phases at a frequency dependent on the speed of rotation of the wheel 42, with the phase relation of such first and second pulse signals being dependent on the direction of rotation of the wheel 42. More particularly, each of the photo-couplers 47 and 48 may include a light source at one side of the plane of rotation of the disk 46 direction a light beam across the peripheral portion of the disk 46 toward a respective photo-cell or other light-receiving element at the opposite side of such plane of rotation. Thus, when the disk 46 is rotated, the light beam emitted from the light source and directed toward the respective photocell is intermittently blocked by the successive light shielding portions 46a of the disk 46, with the result that each of the photo-couplers 47 and 48 provides an alternating signal or pulses at a frequency corresponding to the rotational speed of the disk 46. Furthermore, the angular spacing between the photo-couplers 47 and 48 is selected so that the alternating signals or pulses constituting the outputs from the photo-couplers 47 and 48 will have a phase difference of 90° therebetween. The alternating or pulse signals from the photo-couplers 47 and 48 are applied to Schmitt circuits 49 and 50, respectively, to be wave-shaped by the latter into corresponding rectangular wave signals. The purpose of the Schmitt circuits 49 and 50 is to prevent the transmission through subsequent components of the circuit of irregularities in the pulse signals from the photo-couplers 47 and 48 that would result from wavering in the rotation of the photo-disk 46 caused by uneven manual rotation of the wheel 42.

The rectangular wave signal from Schmitt circuit 49 is applied to the CPU 1 through the interface 10. The frequency of the rectangular wave signal is dependent on the rotational speed of the wheel 7 or 46. In the CPU 1, the frequency of the signal is decoded and the renewal signal dependent on the frequency is supplied to the address signal generator 3. Further, the rectangular wave signals from Schmitt circuits 49 and 50 are respectively applied to D and T inputs of a D-type flip-flop 51 which functions as means for detecting the direction of rotation of manually rotatable wheel 42. For example, the flip-flop 51 may provide signal levels "0" and "1" at its output Q in response to turning of the manually rotatable wheel 42 in the clockwise and counter-clockwise directions, respectively.

The output of this flip-flop 51 is also supplied to the CPU 1 as a direction indicating signal, thereby the direction of the renewal of the address is changed, and so the direction of the scroll can be changed by the direction of the rotation of the wheel 46.

Figure 3:
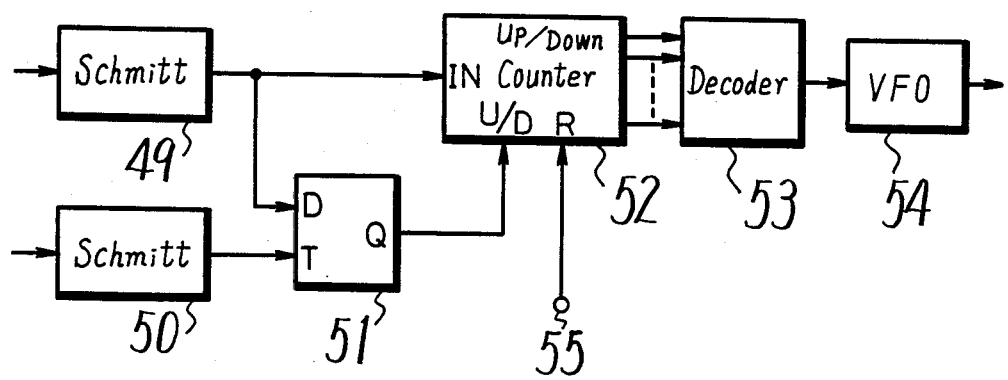
FIG. 3 is a schematic view of another structual embodiment of a device included in the display apparatus of FIG. 1.

The second way of the control is that the scroll speed of the display can be controlled by the rotational angle of the rotational dial 7. The dial or wheel 42, the photo-disc 46 and the photo-couplers 47 and 48 can be formed similarly to those of FIG. 2. The wheel 42 is rotated from an initial or zero position which can be indicated by an arrow on the face of the wheel 42, for example, and it is halted at a desired position. During the rotation, both the photo-couplers 47 and 48 generate pulses the number of which is dependent on the halted position of the wheel. The outputs of the photo-couplers 47 and 48 are supplied to the Schmitt circuits 49 and 50 and the rectangular wave signals are formed thereby. As shown in FIG. 3, the output of the Schmitt circuit 49 is supplied to an up/down counter 52 as a count pulse. This up/down counter 52 is reset by a signal at a terminal 55, that signal is generated, for example when the wheel 46 is set at the initial position and it counts the input pulse from the Schmitt circuit 49. The flip-flop 51 is provided for the same purpose as that of FIG. 2, that is, for generating the direction indicating signal of the rotation of the wheel 42. The output signal of the flip-flop 51 is supplied to the up/down terminal of the up/down counter 52. As explained above with reference to FIG. 2, the flip-flop 51 provides signal levels "0" and "1" at its output Q in response to the turning of the wheel 42 in the clockwise and counter-clockwise directions, respectively. Therefore, the counter 52 counts the input pulse upwardly when the signal with the level "0" is supplied to the up/down terminal, and it counts the input pulse downwardly when the signal with the level "1" is supplied to the up/down terminal. The outputs of this counter 52 is decoded by a decoder 53 and the decoded output of the decoder 53 is supplied to a variable frequency oscillator 54 whose oscillating frequency is controlled by the output of the decoder 53, that is, the contents of the counter 52. The output of the variable frequency oscillator 54 is supplied to the CPU 1 through the interface 10. Accordingly, when the wheel 42 is at its initial position, the scroll of the display is stopped and when the wheel 42 is rotated in the clockwise direction, the data is scrolled upwardly and its scroll speed becomes faster as the rotational angle becomes large from the initial position. And so, the desired data can be found out easily. Another form in which the data is scrolled downwardly when the wheel 42 is rotated in the counter-clockwise direction can be realized by selecting the control circuit. Further embodiment in which the scroll speed of the data is selected to be at the predetermined speed when the wheel 42 is at the initial position and the speed becomes faster or slower when the wheel 42 is rotated in the clockwise direction or counter-clockwise direction, respectively can be realized also.

Figure 4:
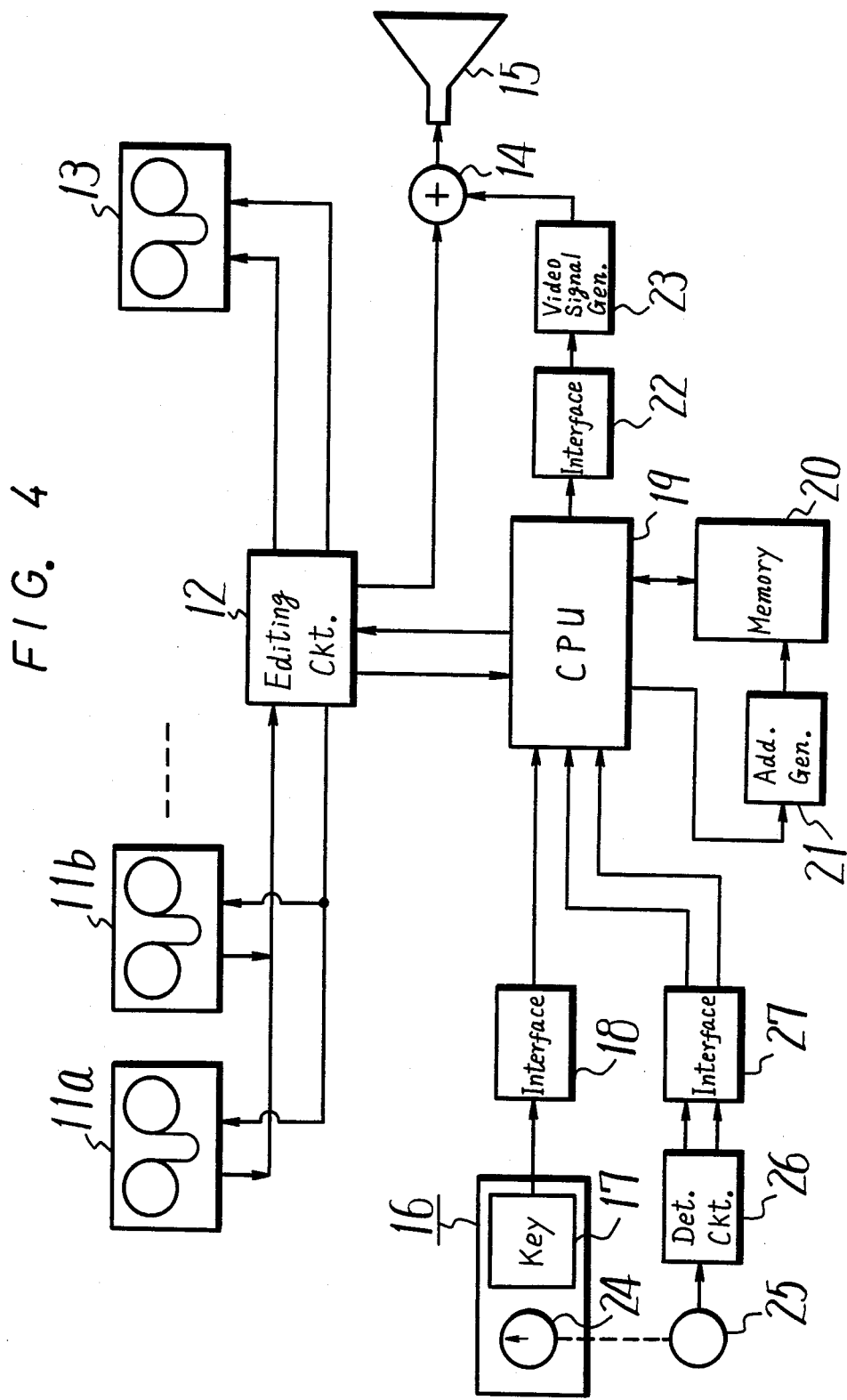
FIG. 4 is a scehmatic view illustrating an editing apparatus to which this invention is applied.

FIG. 4 shows the case where the present invention is applied to edition of a video tape. In the figure, reference numerals 11a 11b, . . . denote reproducing video tape recorders (hereinafter simply referred to VTRs) onto which recorded video tapes are loaded. Video signals and time code signals from these VTRs 11a, 11b . . . , are supplied to an editing circuit 12, and the signal from the editing circuit 12 is supplied to a recording VTR 13 and the video signal from the editing circuit 12 is fed through a mixer 14 to a monitor receiver 15.

Reference numeral 16 denotes an operation panel, in which a signal generated from a keyboard 17 located on this operation panel 16 is supplied through an interface circuit 18 to a CPU 19. The time code signal and the like derived from the editing circuit 12 are supplied to the CPU 19. A control signal is formed by the signal fed from the keyboard 17 in the CPU 19 and is supplied to the editing circuit 12 whereby the VTRs 11a, 11b . . . and 13 are controlled. An editing data is formed by the signal derived from the keyboard 17 in the CPU 19, and this data is fed to a memory 20 to be stored therein. Reference numeral 21 designates an address signal generator for the memory 20. Further, a control signal is formed by the CPU 19 in accordance with the data stored in the memory 20 and, then supplied to the editing circuit 12, while the data read out therefrom is supplied through an interface circuit 22 to a video signal generator 23. The signal from this video signal generator 23 is supplied to the mixer 14, whereby the read out data is displayed on the monitor receiver 15.

Moreover, the operation panel 16 includes a manually rotatable dial 24, and this rotatable dial 24 is provided at its rotational shaft with a pulse generator 25 for producing a pulse at every predetermined rotational angle of the rotatable dial 24. A signal generated from this pulse generator 25 is supplied to a detecting circuit 26, where the waveform of the pulse is reshaped and a signal indicating the rotational direction of the rotatable dial 24 is formed. These signals are supplied to the CPU 19 by way of an interface circuit 27.

In accordance with the circuitry as described above, upon normal edition mode, the tape transport speed of each of the VTRs 11a, 11b . . . is varied in response to the rotation of the rotatable dial 24. That is to say, each time the rotatable dial 24 is rotated by the predetermined angle, the pulse generator 25 produces the pulse. In response to this pulse, rotations of capstans and reel shafts of the VTRs 11a, 11b . . . are controlled.

There are suggested two ways how to control the VTR. One way is called a jog mode, in which each time the aforementioned pulse is generated, the tape is transported by one field. According to this first way, the tape transport speed is varied by the rotational speed of the rotatable dial 24. Especially if the rotatable dial 24 is rotated at low speed, each field is reproduced, namely, a so-called frame-by-frame playback is carried out to find out a desired cue or editing point.

The second way is called a shuttle mode, in which an arrow is drawn on the surface of the rotatable dial 24 at a predetermined part and if this arrow indicated upwardly is taken as an initial or zero position, the aforesaid pulse is counted by an up/down counter. Then, the pulse generator 25 is controlled by the counted value to supply the pulse with a frequency corresponding to the counted value to the CPU 19, whereby the tape is transported by one field each time the above pulse is supplied. According to this second way, when the arrow on the rotatable dial 24 is indicated, for example, upward, the frequency of the pulse generator 25 is selected to be 60 Hz. When the rotatable dial 24 is rotated in the clockwise or right direction, the frequency thereof is increased, while when it is rotated in the counter-clockwise or left direction, the frequency thereof is decreased. Therefore, when the arrow is indicated upward, the normal mode playback is carried out, and when it is rotated in the clockwise direction, the fast-forward mode playback is carried out. When it is rotated in the counter-clockwise direction, the slow mode playback is carried out. Thus the desired cue is detected.

Furthermore, in accordance with this circuitry, when the data stored in the memory 20 is displayed on the monitor receiver 15, the scroll speed of the display is controlled in response to the rotation of the rotatable dial 24. To be more specific, in the afore-said jog or shuttle mode, the pulse to be supplied to the CPU 19 renews the read out address formed by the address generator 21.

According to the above, in like manner that the tape transport speed is varied in the jog or shuttle mode, the scroll speed of the display is changed, in which in the undesired data portion the scroll is made faster, and when the desired data comes nearby, the scroll speed is made slower. Thus the desired data can be retrieved rapidly and easily.

In this way, the data stored in the memory is displayed in the scroll mode. According to this invention, since the scroll speed of the display can be controlled desirably by the rotatable dial, it is possible to check or retrieve the desired data rapidly and easily.

In addition, when the present invention is applied to the edition of the video tape, the rotatable dial for controlling the scroll speed of the display mode serves as those of the jog mode and the shuttle mode so that the number of the apparatus utilized therefor is reduced. Also, since the variation of the tape transport speed upon edition and the variation of the moving speed in the scroll mode are the same in feeling, usability is quite satisfactory.

The above description is given on the preferred embodiment of the invention, but it will be apparent that many modifications and variations could be effected by one skilled in the art without departing from the spirit or scope of the novel concepts of the invention, so that the scope of the invention should be determined by the appended claims only.

I claim as my invention:

1. Apparatus for controlling the vertical scrolling rate and direction of full-screen images of video image data comprising:

video display means for displaying a full-screen video image;

memory means for storing said video image data to be displayed on said display means at a plurality of addresses therein;

address signal generation means for generating an address signal supplied to said memory means for designating a succession of addresses within said memory means at which selected video image data is stored for vertical scrolling display of a full-screen image on said video display means, said succession of addresses being generated at a variable rate and sequential direction in response to an address renewal rate signal;

a rotatable control element for producing an angular rotational displacement signal representing vertical scrolling rate and sequential direction;

control means receiving said signal from said rotatable control element for producing said address renewal rate and direction signal therefrom; and means for reading said selected image data designated by said address signal from said memory means and supplying said selected image data to said display means for vertical scrolling display of a full-screen image thereon;

whereby the rate and sequential direction at which said full-screen images are vertically scrolled on said video display means is dependent upon said angular rotational displacement of said rotatable control element.

2. Apparatus according to claim 1, wherein said display means includes a cathode ray tube, and said reading and supplying means includes a video signal generator for generating a video signal corresponding to said selected data read from said memory means.

3. Apparatus according to claim 1, wherein said rotatable control element produces said signal so as to have a characteristic of the latter varying in dependence on the speed of said angular rotational displacement of said rotatable control element.

4. Apparatus according to claim 3, wherein said control means includes pulse generator means for producing said address renewal rate signal as a pulse train having a frequency dependent on the speed of rotation of said rotatable control element.

5. Apparatus according to claim 4, wherein said rotatable control element includes photo-disc means rotated in accordance with the rotation of the rotatable control element, and photo-coupling means associated with said photo-disc mens so as to generate said pulse train at a frequency dependent on the speed of said angular rotational displacement of said rotatable control element.

6. Apparatus according to claim 1, wherein said rotatable control element produces said signal so as to have a characteristic thereof varying in dependence on the extent of said angular rotational displacement.

7. Apparatus according to claim 6, wherein said control means includes pulse generator means for producing said address renewal rate signal as a number of pulses dependent on said angular rotational displacement of said rotatable control element, an up/down counter supplied with said pulses, and a variable frequency oscillator controlled by the state of said counter.

8. Apparatus according to claim 1, further comprising a plurality of video tape recorders, each of said video tape recorders having a reproducing head, and tape transport means for transporting a tape relative to said reproducing head and thereby causing the latter to scan tracks of said tape in succession for reproducing video signals at a rate dependent on the speed at which said tape is transported, and editing means for editing the reproduced video signals from said video tape recorders, said date stored in said memory representing editing date according to which an editing operation is performed; and in which said control means further controls said tape transport means so that the speed of transport of said tape is varied in dependence on said angular rotational displacement of said rotatable control element.

* * * * *